(12) United States Patent
Hall-Goulle et al.

(10) Patent No.: US 11,407,912 B2
(45) Date of Patent: Aug. 9, 2022

(54) COLORANT MIXTURES

(71) Applicant: HUNTSMAN ADVANCED MATERIALS (SWITZERLAND) GMBH, Basel (CH)

(72) Inventors: Veronique Hall-Goulle, Dornach (CH); Luc Nueffer, Rixheim (FR); Damien Schoehn, Ensisheim (FR); Olivier Brack, Oberwil (CH); Willem Van Daal, Allschwil (CH); Siro Dalle Nogare, Basel (CH); Kurt Plattner, Gelterkinden (CH)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 16/500,106

(22) PCT Filed: Mar. 1, 2018

(86) PCT No.: PCT/EP2018/055035
§ 371 (c)(1),
(2) Date: Oct. 2, 2019

(87) PCT Pub. No.: WO2018/184770
PCT Pub. Date: Oct. 11, 2018

(65) Prior Publication Data
US 2021/0130631 A1 May 6, 2021

(30) Foreign Application Priority Data
Apr. 7, 2017 (EP) .................................. 17165535

(51) Int. Cl.
*D06P 1/00* (2006.01)
*C09D 11/328* (2014.01)
(Continued)

(52) U.S. Cl.
CPC ............ *C09D 11/328* (2013.01); *C09B 1/585* (2013.01); *C09B 29/3639* (2013.01);
(Continued)

(58) Field of Classification Search
CPC ....... C09D 11/328; C09D 11/30; C09D 11/02; C09D 11/037; C09B 67/0041; C09B 67/0055; C09B 67/0046; C09B 69/109; C09B 67/004; C09B 1/585; C09B 29/3639; C09B 29/3691; C09B 67/0051; C06P 1/20; D06P 5/30; D06P 3/54; D06P 3/6041; D06P 3/8233
(Continued)

(56) References Cited

U.S. PATENT DOCUMENTS 3,853,895 A 12/1974 Lamm et al.
4,128,545 A 12/1978 Dehnert et al.
(Continued)

FOREIGN PATENT DOCUMENTS

DE 2226933 A1 12/1973
DE 2258823 A1 6/1974
(Continued)

OTHER PUBLICATIONS

STIC Search Report dated Feb. 10, 2021.*

*Primary Examiner* — Eisa B Elhilo
(74) *Attorney, Agent, or Firm* — Huntsman International LLC; Robert Holthus

(57) ABSTRACT

The present invention relates to a colorant mixture comprising
(A) at least one blue- or black-dyeing disperse dye of formula

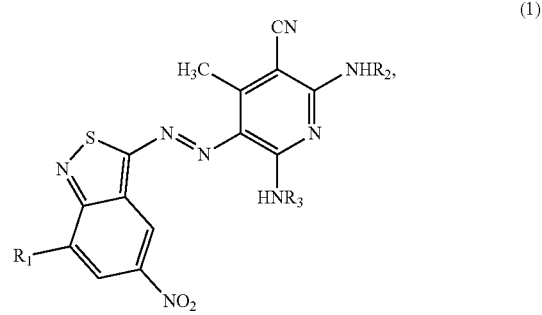

(1)

wherein
$R_1$ denotes hydrogen or halogen,
$R_2$ and $R_3$ are each independently of the other hydrogen; $C_1$-$C_8$-alkyl which is unsubstituted or substituted with hydroxy, cyano, $C_1$-$C_4$alkoxy or halogen;
—$(CH_2)_n$—O—$(CH_2)_m R_4$, wherein $R_4$ denotes hydrogen or $C_1$-$C_8$-alkyl, n is a number from 2 to 6 and m is a number from 0 to 6;
$C_5$-$C_{24}$aryl which is unsubstituted or substituted with hydroxy, carboxy, cyano, $C_1$-$C_8$alkyl, $C_1$-$C_4$alkoxy or halogen; or
$C_6$-$C_{30}$aralkyl which is unsubstituted or substituted with hydroxy, cyano, $C_1$-$C_4$alkyl, $C_1$-$C_8$alkoxy groups or halogen; and
(B) at least one yellow-, orange- or red-dyeing disperse dye, solvent dye, vat dye or pigment; and to the use thereof in dyeing or printing cellulose or cellulose blend fibre materials.

12 Claims, No Drawings

(51) Int. Cl.
*C09B 1/58* (2006.01)
*C09B 29/42* (2006.01)
*C09B 29/36* (2006.01)
*C09B 67/22* (2006.01)
*C09D 11/037* (2014.01)
*D06P 1/18* (2006.01)
*D06P 1/20* (2006.01)
*D06P 5/30* (2006.01)
*D06P 3/54* (2006.01)
*D06P 3/60* (2006.01)
*D06P 3/82* (2006.01)

(52) U.S. Cl.
CPC ...... *C09B 29/3691* (2013.01); *C09B 67/0041* (2013.01); *C09B 67/0051* (2013.01); *C09D 11/037* (2013.01); *D06P 1/18* (2013.01); *D06P 1/20* (2013.01); *D06P 5/30* (2013.01); *D06P 3/54* (2013.01); *D06P 3/6041* (2013.01); *D06P 3/8233* (2013.01)

(58) Field of Classification Search
USPC .............................................. 8/465
See application file for complete search history.

(56) References Cited

U.S. PATENT DOCUMENTS

| | | |
|---|---|---|
| 4,650,860 A | 3/1987 | Dehnert et al. |
| 2007/0000076 A1* | 1/2007 | Hall-Goulle ............ D06P 1/613 |
| | | 8/636 |

FOREIGN PATENT DOCUMENTS

| | | |
|---|---|---|
| DE | 2259684 A1 | 6/1974 |
| DE | 2309638 A1 | 9/1974 |
| EP | 3084150 A1 | 7/1983 |
| WO | 02059216 A1 | 8/2002 |
| WO | 2005024123 A2 | 3/2005 |

* cited by examiner

COLORANT MIXTURES

CROSS-REFERENCE TO RELATED APPLICATIONS

This application is the National Phase of International Application PCT/EP2018/055035 filed Mar. 1, 2018 which designated the U.S., and which claims priority to European App. Serial No. 17165535.0 filed Apr. 7, 2017. The noted applications are incorporated herein by reference.

The present invention relates to colorant mixtures comprising at least one blue or black disperse dye and at least one yellow, orange or red disperse dye, solvent dye, vat dye or pigment and to the use thereof in dyeing or printing cellulose and cellulose blend fibre materials as well as polyester and polyester blend fibre materials, especially textile materials.

Printing techniques like screen printing or inkjet printing have been used in the textile industry for some time mainly to impose a design on fabrics.

While cellulose fibres like cotton (CO) and linen are usually printed with reactive dyes, printing of synthetic fibre materials like polyester (PES) is typically performed by application of disperse dyes.

Many attempts have been made to develop efficient processes for printing PES/CO blends. Usually reactive dyes are combined with disperse dyes.

However, the use of such colorant mixtures is associated with several drawbacks and it is hardly possible to obtain the same shade and colour depth on the two fibres by this method. Alternatively, PES/CO blends and even CO can be printed with pigments and binders. However, poor handle and rubbing fastness are strong drawbacks of this technology. Accordingly, there is a need in particular for new dyes and colorant mixtures for a printing method for CO and PES/CO blends providing navy blue and black shades which works without a combination of reactive and disperse dyes and provides printings exhibiting good wash fastness, light-fastness, rubbing fastness, colour strength and brilliance as well as soft handle.

The compatibility of two or more dyestuffs in dyemixtures requires that said dyestuffs exhibit a similar uptake behaviour and build-up properties. If this condition is not fulfilled, the dyeings suffer from blotchiness and generally insufficient evenness.

Surprisingly, we found that azo dyes based on benzisothiazoles as diazo components and specific 2,6-aminosubstituted 3-cyano-4-methylpyridines as coupling components can be combined with any yellow, orange or red disperse dye, solvent dye, vat dye or pigment and thus provide even dyeings showing good washing fastness and excellent light fastness results on cotton and polyester, as well as on PES/CO blends.

The present invention relates to colorant mixtures comprising
(A) at least one blue- or black-dyeing disperse dye of formula

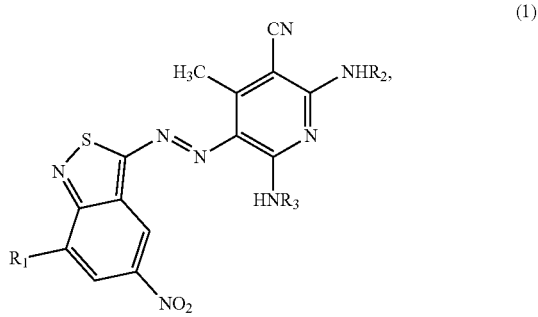

(1)

wherein
$R_1$ denotes hydrogen or halogen,
$R_2$ and $R_3$ are each independently of the other hydrogen; $C_1$-$C_8$-alkyl which is unsubstituted or substituted with hydroxy, cyano, $C_1$-$C_4$alkoxy or halogen;
—$(CH_2)_n$—O—$(CH_2)_m R_4$, wherein $R_4$ denotes hydrogen or $C_1$-$C_8$-alkyl, n is a number from 2 to 6 and m is a number from 0 to 6;
$C_5$-$C_{24}$aryl which is unsubstituted or substituted with hydroxy, carboxy, cyano, $C_1$-$C_8$alkyl, $C_1$-$C_4$alkoxy or halogen; or
$C_6$-$C_{30}$aralkyl which is unsubstituted or substituted with hydroxy, cyano, $C_1$-$C_4$alkyl, $C_1$-$C_8$alkoxy groups or halogen; and
(B) at least one yellow-, orange- or red-dyeing disperse dye, solvent dye, vat dye or pigment.

Azo dyes based on benzisothiazoles as diazotizing components and 2,6-aminosubstituted 3-cyano-4-methylpyridines as coupling components are known, for example, from U.S. Pat. No. 4,650,860.

Any radical in formula (1) denoting alkyl may be a straight-chain or branched alkyl radical.

Examples of alkyl groups include methyl, ethyl, n-propyl, isopropyl, n-butyl, isobutyl, sec-butyl, tert-butyl, n-pentyl, isopentyl, neopentyl, n-hexyl, n-octyl, i-octyl, n-decyl and n-dodecyl.

$C_1$-$C_{12}$ alkoxy may be, for example, methoxy, ethoxy, n-propoxy, isopropoxy, n-butoxy, iso-butoxy, sec-butoxy, tert-butoxy, n-pentoxy, neopentoxy, n-hexoxy, n-octoxy, i-octoxy, n-decoxy or n-dodecoxy.

Examples of suitable aryl groups are phenyl, tolyl, mesityl, isityl, 2-hydroxyphenyl, 4-hydroxyphenyl, 2-chlorophenyl, 4-chlorophenyl, 2,6-dichlorophenyl, 2-aminophenyl, 3-aminophenyl, 4-aminophenyl, 4-methoxyphenyl, 4-ethoxyphenyl, naphthyl and phenanthryl.

Examples of suitable $C_6$-$C_{30}$aralkyl groups are benzyl, 2-phenylethyl, tolylmethyl, mesitylmethyl and 4-chlorophenylmethyl.

Any radical denoting halogen may be fluorine, chlorine or bromine, in particular chlorine or bromine.

Preference is given to mixtures containing azo dyes of formula (1), wherein $R_1$ denotes hydrogen.

Likewise, colorant mixtures are preferred, wherein comprising as component (A) a dye of formula (1), wherein at least one of $R_2$ and $R_3$ denotes $C_6$-$C_{24}$aryl which is unsubstituted or substituted with hydroxy, carboxy, cyano, $C_1$-$C_8$alkyl, $C_1$-$C_4$alkoxy or halogen.

Further preference is given to mixtures comprising azo dyes of formula (1) wherein $R_2$ and $R_3$ are 3-methoxypropyl, phenyl, tolyl or 2-phenylethyl.

The dyes of formulae (103) and (104) are particularly preferred.

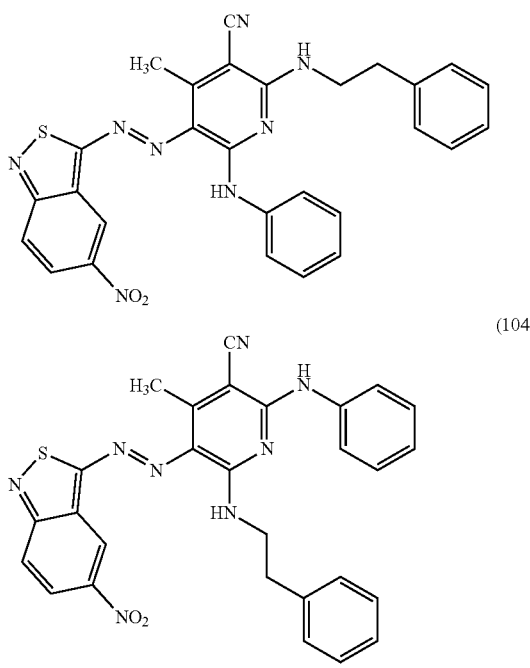

The dyes of formula (1) can be prepared according to known methods, for instance by conventional coupling reaction of the relevant diazonium salt with the respective coupling component, as described for example in U.S. Pat. No. 4,650,860.

The coupling components for the preparation of the dyestuffs of formula (1) are usually prepared according to U.S. Pat. No. 3,853,895 by reacting 2,6-dichloro-3-cyano-4-methylpyridine first with the compound $R_2$—$NH_2$ and then with $R_3$—$NH_2$, wherein $R_2$ and $R_3$ are as defined above. In case $R_2$ and $R_3$ are not identical, normally a mixture of two different isomers arises. From the resulting coupling component mixture, the individual coupling components can be obtained by subsequent chromatographic separation.

However, with regard to the use-oriented properties of the resulting dyestuffs it is not necessary to separate the isomeric coupling components, but they can be reacted as a mixture with the diazonium salt thus providing a mixture of dyestuffs which has no detrimental effect in comparison with the single components.

Accordingly, the isomeric coupling components resulting from the reaction of 2,6-dichloro-3-cyano-4-methylpyridine with $R_2$—$NH_2$ and $R_3$—$NH_2$, as well as the dyemixtures resulting therefrom are usually not separated.

Disperse dyes, solvent dyes, vat dyes and pigments which can be applied as component (B) are likewise known in the art.

Suitable examples are the following compounds:

C.I. Disperse Yellow 42, C.I. Disperse Yellow 114, C.I. Disperse Yellow 246, C.I. Disperse Yellow 251, C.I. Disperse Orange 157, C.I. Solvent Yellow 2, C.I. Solvent Yellow 3, C.I. Solvent Yellow 7, C.I. Solvent Yellow 12, C.I. Solvent Yellow 16, C.I. Solvent Yellow 14, C.I. Solvent Yellow 16, C.I. Solvent Yellow 18, C.I. Solvent Yellow 28, C.I. Solvent Yellow 33, C.I. Solvent Yellow 43, C.I. Solvent Yellow 44, C.I. Solvent Yellow 56, C.I. Solvent Yellow 72, C.I. Solvent Yellow 77, C.I. Solvent Yellow 98, C.I. Solvent Yellow 114, C.I. Solvent Yellow 116, C.I. Solvent Yellow 117, C.I. Solvent Yellow 130, C.I. Solvent Yellow 131, C.I. Solvent Yellow 133, C.I. Solvent Yellow 135, C.I. Solvent Yellow 141, C.I. Solvent Yellow 145, C.I. Solvent Yellow 157, C.I. Solvent Yellow 160:1, C.I. Solvent Yellow 162, C.I. Solvent Yellow 163, C.I. Solvent Yellow 167, C.I. Solvent Yellow 176, C.I. Solvent Yellow 181, C.I. Solvent Yellow 182, C.I. Solvent Yellow 183, C.I. Solvent Yellow 184, C.I. Solvent Yellow 185, C.I. Solvent Yellow 187, C.I. Solvent Yellow 189, C.I. Solvent Orange 7, C.I. Solvent Orange 60, C.I. Solvent Orange 63, C.I. Solvent Orange 86, C.I. Solvent Orange 102, C.I. Solvent Orange 105, C.I. Solvent Orange 113, C.I. Solvent Orange 116, C.I. Vat Blue 1, C.I. Solvent Orange 86, C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 9, C.I. Pigment Yellow 10, C.I. Pigment Yellow 65, C.I. Pigment Yellow 73, C.I. Pigment Yellow 74, C.I. Pigment Yellow 75, C.I. Pigment Yellow 97, C.I. Pigment Yellow 105, C.I. Pigment Yellow 108, C.I. Pigment Yellow 109, C.I. Pigment Yellow 110, C.I. Pigment Yellow 111, C.I. Pigment Yellow 116, C.I. Pigment Yellow 120, C.I. Pigment Yellow 130, C.I. Pigment Yellow 138, C.I. Pigment Yellow 139, C.I. Pigment Yellow 147, C.I. Pigment Yellow 151, C.I. Pigment Yellow 154, C.I. Pigment Yellow 165, C.I. Pigment Yellow 167, C.I. Pigment Yellow 173, C.I. Pigment Yellow 175, C.I. Pigment Yellow 182, C.I. Pigment Yellow 185, C.I. Pigment Yellow 193, C.I. Pigment Yellow 194, C.I. Pigment Yellow 199, C.I. Pigment Yellow 202, C.I. Pigment Yellow 203, C.I. Pigment Orange 1, C.I. Pigment Orange 2, C.I. Pigment Orange 5, C.I. Pigment Orange 22, C.I. Pigment Orange 24, C.I. Pigment Orange 36, C.I. Pigment Orange 61, C.I. Pigment Orange 62, C.I. Pigment Orange 64, C.I. Pigment Orange 67, C.I. Pigment Orange 69, C.I. Pigment Orange 71, C.I. Pigment Orange 73, 1,5-diphenoxy-9,10-anthracenedione and 1,8-diphenoxy-9,10-anthracenedione.

Preferably, colorant mixture according to the invention contains as component (B) a dye of formula (2) or (3)

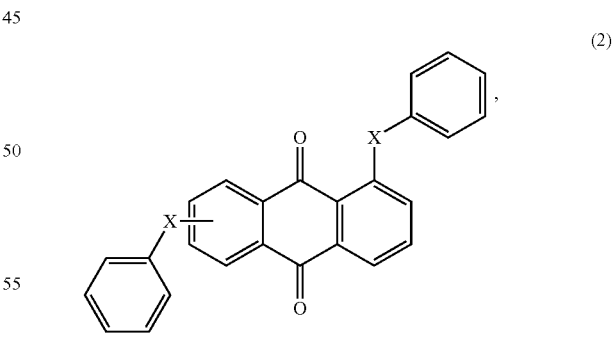

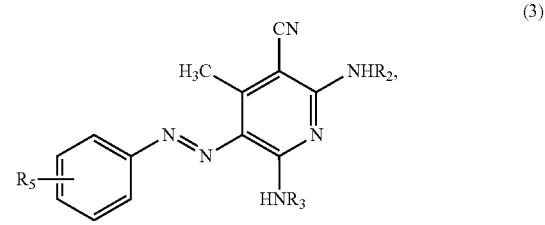

wherein X denotes —O—, —S— or —NHCO—,

R$_2$ and R$_3$ are as defined above, and

R$_5$ is —CF$_3$ or —CN.

Particularly preferred are colorant mixtures comprising as component (B) a dye of formula (201)

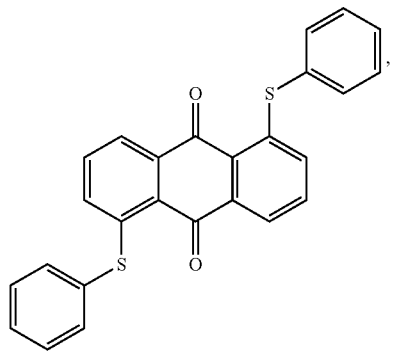

(201)

or a dye of formula (301)

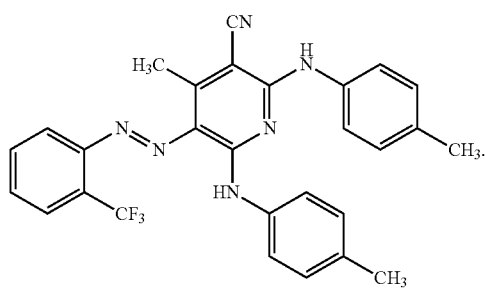

(301)

The colorant mixture according to the invention can be prepared, for example, by mixing the individual dyes together. The mixing procedure is effected, for example, in suitable mills, e.g. ball mills or pin mills, as well as in kneaders or mixers. The colorant mixtures according to the invention can also be prepared, for example, by dispersing the colorants directly in the dyebath or the printing medium, if necessary in the presence of suitable dispersing agents.

The amount of the individual disperse dyes is governed by the shade to be obtained. The colorant mixtures according to the invention purposively contain, based on the total weight of components (A)+(B), 30-99% by weight of component (A) and 1-70% by weight of component (B), preferably 35-95% by weight of component (A) and 5-65% by weight of component (B), more preferably 40-85% by weight of component (A) and 15-60% by 170 weight of component (B) and in particular 45-80% by weight of component (A) and 20-55% by weight of component (B).

The disperse dyes of formula

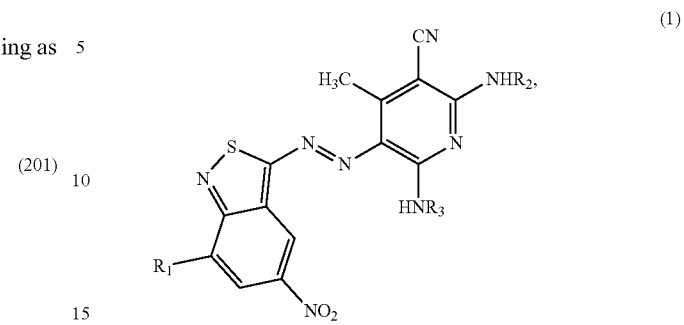

(1)

wherein

R$_1$ denotes hydrogen or halogen,

R$_2$ and R$_3$ are each independently of the other hydrogen; C$_1$-C$_8$-alkyl which is unsubstituted or substituted with hydroxy, cyano, C$_1$-C$_4$alkoxy or halogen;

—(CH$_2$)$_n$—O—(CH$_2$)$_m$R$_4$, wherein R$_4$ denotes hydrogen or C$_1$-C$_8$-alkyl, n is a number from 2 to 6 and m is a number from 0 to 6;

C$_5$-C$_{24}$aryl which is unsubstituted or substituted with hydroxy, carboxy, cyano, C$_1$-C$_8$alkyl, C$_1$-C$_4$alkoxy or halogen;

with the proviso that at least one of the radicals R$_2$ and R$_3$ is tolyl, are novel and therefore constitute a further object of the present invention.

The colorants and colorant mixtures according to the invention may be used for dyeing or printing cellulose (CEL) or PES or PES/CEL blend fibre material, especially textile material.

Accordingly, the invention further relates to a process for dyeing or printing cellulose or cellulose blend fibre material, wherein a colorant mixture containing components (A) and (B) as defined above is applied to the said material or incorporated into it.

The colorants and colorant mixtures according to the invention are suitable for dyeing in accordance with the thermosol process, in the exhaust process and for printing processes.

The application of the colorants and colorant mixtures according to the invention to the fibre materials can be effected in accordance with known dyeing methods. For example, cotton or cotton/PES blend fibre materials can be dyed in the exhaust process from an aqueous dispersion in the presence of customary anionic or non-ionic dispersants and, optionally, customary swelling agents (carriers) at temperatures of from 80 to 140° C.

The dyes and colorant mixtures according to the present disclosure can advantageously be applied in the process described in WO 2005/024123.

Accordingly, the invention further relates to a process for dyeing or printing cellulose or cellulose blend fibre material, characterised in that the fibre material is treated in any sequence with water, a water-soluble organic solvent having a boiling point>150° C. and a colorant mixture as defined above.

In a preferred embodiment of this process the fibre material is in a first step treated with a water-soluble organic solvent having a boiling point>150° C. and is subsequently printed with an aqueous ink comprising a colorant mixture as defined above.

In such processes, the said fibre materials can be in a variety of processing forms, e.g. in the form of fibres, yarns or nonwoven, woven or knitted fabrics.

It is advantageous to convert the colorant according to the invention into a colorant preparation prior to use. For this purpose, the colorant is ground so that its particle size is on average from 0.10 to 10 microns. Grinding can be carried out in the presence of beads and dispersants. For example, the dried colorant or the wet presscake is ground together with a dispersant or kneaded into a paste form together with a dispersant and then optionally dried in vacuo or by atomisation. After adding water to the dried powder or using the liquid dispersion, the resulting preparations can be used to prepare printing pastes and dyebaths.

For printing, the customary thickeners will be used, e.g. modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The dyes of formula (1) according to the invention are also suitable as colorants for use in recording systems. Such recording systems are, for example, commercially available ink-jet printers for paper or textile printing, or writing instruments, such as fountain pens or ballpoint pens, and especially ink-jet printers. For that purpose, the dyes according to the invention are first brought into a form suitable for use in recording systems. A suitable form is, for example, an aqueous ink, which comprises the dyes according to the invention as colorants. The inks can be prepared in customary manner by grinding the dyes to the appropriate particle size in the nanometer range and mixing together the individual components, if necessary in combination with suitable dispersing agents, in the desired amount of water and, optionally, co-solvents.

The colorants according to the invention impart to the said materials, especially to CO, PES and CO/PES blend materials, level colour shades having good in-use fastness properties such as fastness to light, fastness to heat setting, fastness to pleating, fastness to chlorine and wet fastness, e.g. fastness to water, to rubbing, to perspiration and to washing; the finished dyeings are further characterised by good fastness to rubbing. Special emphasis should be given to the good fastness to washing, fastness to rubbing and excellent light fastness of the dyeings, as well as a very soft handle.

The present invention further relates to the above-mentioned use of the dyes according to the invention as well as to a process for the dyeing or printing of cellulose or cellulose blend fibre materials, especially textile materials, in which process a dye according to the invention is applied to the said materials or incorporated into them. The said fibre materials are preferably textile CO, PES or CO/PES materials. Further substrates that can be treated by the process according to the invention and preferred process conditions can be found hereinbefore in the more detailed description of the use of the dyes according to the invention.

Preferably, the dye of formula (1) is applied to CO, PES or CO/PES blend fibre material by screen-printing or by inkjet-printing.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The present invention accordingly relates also to aqueous inks that comprise the dyes of formula (1) according to the invention and to the use of such inks in an ink-jet printing method for printing a variety of substrates, especially textile fibre materials, the definitions and preferences indicated above applying to the dyes, the inks and the substrates.

The invention relates also to CO, PES or CO/PES blend fibre materials, preferably CO, PES or CO/PES textile materials, dyed or printed by the said process.

The dyes according to the invention are, in addition, suitable for modern reproduction processes, e.g. thermotransfer printing.

The Examples that follow serve to illustrate the invention. Parts therein are parts by weight and percentages are percentages by weight, unless otherwise indicated. Temperatures are given in degrees Celsius. The relationship between parts by weight and parts by volume is the same as between grams and cubic centimetres.

I. PREPARATION EXAMPLES

I. 1 Dyestuff of Formula (101)

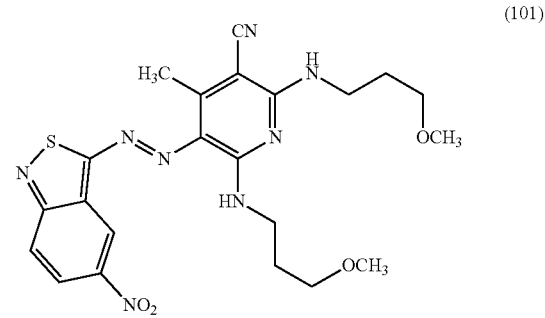 [SMILES: COCCCNc1nc(NCCCOC)c(/N=N/c2snc3ccc([N+](=O)[O-])cc23)c(C)c1C#N]

(101)

To 174 parts of sulfuric acid (96%) maintained at 5-10° C. are added 20 parts of water over a period of 10 minutes. Over a period of 20 minutes at 10-20° C., 21.5 parts of 3-amino-5-nitro-2,1-benzoisothiazole are then added to the reaction mixture. After stirring for 3 hours at 10-15° C., the reaction mixture is cooled down to 0-5° C. and 36.4 parts of nitrosylsulfuric acid (40%) are added over 45 minutes. This reaction mixture (A) is stirred for 4.5 hours at 5-7° C. In the meantime, to 200 parts of acetic acid (100%) are added 21.1 parts of 2,6-bis-(3-methoxypropylamino)-3-cyano-4-methylpyridine at room temperature over a period of 10 minutes, after which 7.5 parts of sulfuric acid are added, followed by 35 parts of ice/water mixture and the mixture is stirred for 5 minutes. After cooling down to 5-7° C., 252 parts of the previous reaction mixture (A) are added over a period of 45 minutes. At the same time, 200 parts of acetic acid and 35 parts of water are added and the temperature is kept at 5-7° C. The reaction mixture so obtained is cooled down to 0-5° C. and 300 parts of sodium hydroxide solution (4N) are added over 2 hours whilst maintaining the reaction temperature at 0-5° C. The reaction mixture is stirred for an additional 3 hours at 0-5° C., then the temperature is allowed to rise slowly to 20° C. with stirring, after which 300 parts of sodium hydroxide solution (4N) are added at 20-25° C. over a period of 2 hours. Filtration of the reaction mixture and washing with water affords 191 parts of the crude filter cake.

I. 2 Dyestuff of Formula (102)

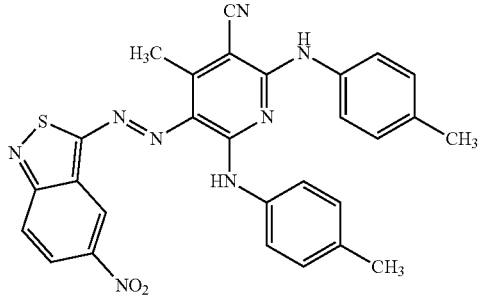
(102)

To 174 parts of sulfuric acid (96%) maintained at 5-10° C. are added 20 parts of water over a period of 10 minutes. Over a period of 20 minutes at 10-20° C., 21.5 parts of 3-amino-5-nitro-2,1-benzoisothiazole are then added to the reaction mixture. After stirring for 3 hours at 10-15° C., the reaction mixture is cooled down to 0-5° C. and 36.4 parts of nitrosylsulfuric acid (40%) are added over 45 minutes. This reaction mixture (A) is stirred for 4.5 hours at 5-7° C. In the meantime, to 200 parts of acetic acid (100%) are added 23.8 parts of 2,6-bis-(p-tolylamino)-3-cyano-4-methylpyridine at room temperature over a period of 10 minutes, after which 7.5 parts of sulfuric acid are added, followed by 35 parts of ice/water mixture and the mixture is stirred for 5 minutes. After cooling down to 5-7° C., 252 parts of the previous reaction mixture (A) are added over a period of 45 minutes. At the same time, 200 parts of acetic acid and 35 parts of water are added and the temperature is kept at 5-7° C. The reaction mixture so obtained is cooled down to 0-5° C. and 300 parts of sodium hydroxide solution (4N) are added over 2 hours whilst maintaining the reaction temperature at 0-5° C. The reaction mixture is stirred for an additional 3 hours at 0-5° C., then the temperature is allowed to rise slowly to 20° C. with stirring, after which 300 parts of sodium hydroxide solution (4N) are added at 20-25° C. over a period of 2 hours. Filtration of the reaction mixture and washing with water affords 162 parts of the crude filter cake.

Differential Scanning Calorimetry: decomposition>220° C.

$\lambda_{max}$=639 nm ($\lambda_{max}$=wavelength of the absorption maximum, measured in DMF)

| Elemental Analysis: | theory | found |
|---|---|---|
| C | 62.9% | 62.3% |
| H | 4.1% | 4.2% |
| N | 21.0% | 20.0% |
| S | 6.0% | 5.9% |

$^1$H-NMR (CDCl$_3$, 250 MHz): δ=9.035 (s, 1H), 8.22 (d, 1H), 7.78 (d, 1H), 7.62-7.16 (m, 8H), 2.83 (s, 3H), 2.42 (s, 3H), 2.41 (s, 3H)

I. 3 Dyestuffs of Formulae (103) and (104)

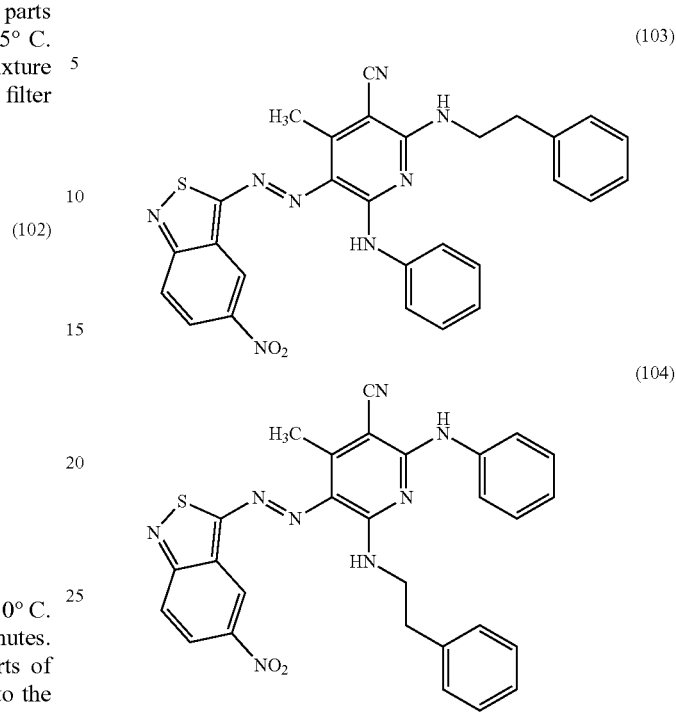

Example I. 1 is repeated by using a mixture of 2-phenylamino-6-(2-phenylethylamino)-3-cyano-4-methylpyridine and 2-(2-phenylethylamino)-6-phenylamino-3-cyano-4-methylpyridine as coupling component instead of 2,6-bis-(3-methoxypropylamino)-3-cyano-4-methylpyridine.

$\lambda_{max}$=598 nm ($\lambda_{max}$=wavelength of the absorption maximum, measured in DMF)

| Elemental Analysis: | theory | found |
|---|---|---|
| C | 62.9% | 62.7% |
| H | 4.1% | 4.1% |
| N | 21.0% | 20.6% |
| S | 6.0% | 6.0% |

Examples I. 3 to I. 191

As described in Example I. 1, the following dyestuffs can be prepared in an analogous manner:

| Ex. | R1 | R$_2$ | R$_3$ |
|---|---|---|---|
| I.4 | H | phenyl | phenyl |
| I.5 | H | mesityl | mesityl |
| I.6 | H | 2,4-dimethylphenyl | 2,4-dimethylphenyl |
| I.7 | H | o-tolyl | o-tolyl |
| I.8 | H | sec-butyl | p-tolyl |
| I.9 | H | p-tolyl | sec-butyl |
| I.10 | H | t-butyl | p-tolyl |
| I.11 | H | p-tolyl | t-butyl |
| I.12 | H | n-butyl | p-tolyl |
| I.13 | H | p-tolyl | n-butyl |
| I.14 | H | i-propyl | p-tolyl |
| I.15 | H | p-tolyl | i-propyl |
| I.16 | H | n-propyl | p-tolyl |
| I.17 | H | p-tolyl | n-propyl |
| I.18 | H | ethyl | p-tolyl |
| I.19 | H | p-tolyl | ethyl |
| I.20 | H | H | p-tolyl |

-continued

| Ex. | R1 | R₂ | R₃ |
|---|---|---|---|
| I.21 | H | p-tolyl | H |
| I.22 | H | methyl | p-tolyl |
| I.23 | H | p-tolyl | methyl |
| I.24 | H | 3-methoxypropyl | p-tolyl |
| I.25 | H | p-tolyl | 3-methoxypropyl |
| I.26 | H | 3-ethoxypropyl | p-tolyl |
| I.27 | H | p-tolyl | 3-ethoxypropyl |
| I.28 | H | 2-(2-methoxyethoxy)ethyl | p-tolyl |
| I.29 | H | p-tolyl | 2-(2-methoxyethoxy)ethyl |
| I.30 | H | sec-butyl | mesityl |
| I.31 | H | mesityl | sec-butyl |
| I.32 | H | t-butyl | mesityl |
| I.33 | H | mesityl | t-butyl |
| I.34 | H | n-butyl | mesityl |
| I.35 | H | mesityl | n-butyl |
| I.36 | H | i-propyl | mesityl |
| I.37 | H | mesityl | i-propyl |
| I.38 | H | n-propyl | mesityl |
| I.39 | H | mesityl | n-propyl |
| I.40 | H | ethyl | mesityl |
| I.41 | H | mesityl | ethyl |
| I.42 | H | H | mesityl |
| I.43 | H | mesityl | H |
| I.44 | H | methyl | mesityl |
| I.45 | H | mesityl | methyl |
| I.46 | H | 3-methoxypropyl | mesityl |
| I.47 | H | mesityl | 3-methoxypropyl |
| I.48 | H | 3-ethoxypropyl | mesityl |
| I.49 | H | mesityl | 3-ethoxypropyl |
| I.50 | H | 2-(2-methoxyethoxy)ethyl | mesityl |
| I.51 | H | mesityl | 2-(2-methoxyethoxy)ethyl |
| I.52 | H | sec-butyl | 2,4-dimethylphenyl |
| I.53 | H | 2,4-dimethylphenyl | sec-butyl |
| I.54 | H | t-butyl | 2,4-dimethylphenyl |
| I.55 | H | 2,4-dimethylphenyl | t-butyl |
| I.56 | H | n-butyl | 2,4-dimethylphenyl |
| I.57 | H | 2,4-dimethylphenyl | n-butyl |
| I.58 | H | i-propyl | 2,4-dimethylphenyl |
| I.59 | H | 2,4-dimethylphenyl | i-propyl |
| I.60 | H | n-propyl | 2,4-dimethylphenyl |
| I.61 | H | 2,4-dimethylphenyl | n-propyl |
| I.62 | H | ethyl | 2,4-dimethylphenyl |
| I.63 | H | 2,4-dimethylphenyl | ethyl |
| I.64 | H | H | 2,4-dimethylphenyl |
| I.65 | H | 2,4-dimethylphenyl | H |
| I.66 | H | methyl | 2,4-dimethylphenyl |
| I.67 | H | 2,4-dimethylphenyl | methyl |
| I.68 | H | 3-methoxypropyl | 2,4-dimethylphenyl |
| I.69 | H | 2,4-dimethylphenyl | 3-methoxypropyl |
| I.70 | H | 3-ethoxypropyl | 2,4-dimethylphenyl |
| I.71 | H | 2,4-dimethylphenyl | 3-ethoxypropyl |
| I.72 | H | 2-(2-methoxyethoxy)ethyl | 2,4-dimethylphenyl |
| I.73 | H | 2,4-dimethylphenyl | 2-(2-methoxyethoxy)ethyl |
| I.74 | H | sec-butyl | o-tolyl |
| I.75 | H | o-tolyl | sec-butyl |
| I.76 | H | t-butyl | o-tolyl |
| I.77 | H | o-tolyl | t-butyl |
| I.78 | H | n-butyl | o-tolyl |
| I.79 | H | o-tolyl | n-butyl |
| I.80 | H | i-propyl | o-tolyl |
| I.81 | H | o-tolyl | i-propyl |
| I.82 | H | n-propyl | o-tolyl |
| I.83 | H | o-tolyl | n-propyl |
| I.84 | H | ethyl | o-tolyl |
| I.85 | H | o-tolyl | ethyl |
| I.86 | H | H | o-tolyl |
| I.87 | H | o-tolyl | H |
| I.88 | H | methyl | o-tolyl |
| I.89 | H | o-tolyl | methyl |
| I.90 | H | 3-methoxypropyl | o-tolyl |
| I.91 | H | o-tolyl | 3-methoxypropyl |
| I.92 | H | 3-ethoxypropyl | o-tolyl |
| I.93 | H | o-tolyl | 3-ethoxypropyl |
| I.94 | H | 2-(2-methoxyethoxy)ethyl | o-tolyl |
| I.95 | H | o-tolyl | 2-(2-methoxyethoxy)ethyl |
| I.96 | Br | phenyl | phenyl |
| I.97 | Br | mesityl | mesityl |
| I.98 | Br | 2,4-dimethylphenyl | 2,4-dimethylphenyl |
| I.99 | Br | o-tolyl | o-tolyl |
| I.100 | Br | sec-butyl | p-tolyl |
| I.101 | Br | p-tolyl | sec-butyl |
| I.102 | Br | t-butyl | p-tolyl |
| I.103 | Br | p-tolyl | t-butyl |
| I.104 | Br | n-butyl | p-tolyl |
| I.105 | Br | p-tolyl | n-butyl |
| I.106 | Br | i-propyl | p-tolyl |
| I.107 | Br | p-tolyl | i-propyl |
| I.108 | Br | n-propyl | p-tolyl |
| I.109 | Br | p-tolyl | n-propyl |
| I.110 | Br | ethyl | p-tolyl |
| I.111 | Br | p-tolyl | ethyl |
| I.112 | Br | H | p-tolyl |
| I.113 | Br | p-tolyl | H |
| I.114 | Br | methyl | p-tolyl |
| I.115 | Br | p-tolyl | methyl |
| I.116 | Br | 3-methoxypropyl | p-tolyl |
| I.117 | Br | p-tolyl | 3-methoxypropyl |
| I.118 | Br | 3-ethoxypropyl | p-tolyl |
| I.119 | Br | p-tolyl | 3-ethoxypropyl |
| I.120 | Br | 2-(2-methoxyethoxy)ethyl | p-tolyl |
| I.121 | Br | p-tolyl | 2-(2-methoxyethoxy)ethyl |
| I.122 | Br | sec-butyl | mesityl |
| I.123 | Br | mesityl | sec-butyl |
| I.124 | Br | t-butyl | mesityl |
| I.125 | Br | mesityl | t-butyl |
| I.126 | Br | n-butyl | mesityl |
| I.127 | Br | mesityl | n-butyl |
| I.128 | Br | i-propyl | mesityl |
| I.129 | Br | mesityl | i-propyl |
| I.130 | Br | n-propyl | mesityl |
| I.131 | Br | mesityl | n-propyl |
| I.132 | Br | ethyl | mesityl |
| I.133 | Br | mesityl | ethyl |
| I.134 | Br | H | mesityl |
| I.135 | Br | mesityl | H |
| I.136 | Br | methyl | mesityl |
| I.137 | Br | mesityl | methyl |
| I.138 | Br | 3-methoxypropyl | mesityl |
| I.139 | Br | mesityl | 3-methoxypropyl |
| I.140 | Br | 3-ethoxypropyl | mesityl |
| I.141 | Br | mesityl | 3-ethoxypropyl |
| I.142 | Br | 2-(2-methoxyethoxy)ethyl | mesityl |
| I.143 | Br | mesityl | 2-(2-methoxyethoxy)ethyl |
| I.144 | Br | sec-butyl | 2,4-dimethylphenyl |
| I.145 | Br | 2,4-dimethylphenyl | sec-butyl |
| I.146 | Br | t-butyl | 2,4-dimethylphenyl |
| I.147 | Br | 2,4-dimethylphenyl | t-butyl |
| I.148 | Br | n-butyl | 2,4-dimethylphenyl |
| I.149 | Br | 2,4-dimethylphenyl | n-butyl |
| I.150 | Br | i-propyl | 2,4-dimethylphenyl |
| I.151 | Br | 2,4-dimethylphenyl | i-propyl |
| I.152 | Br | n-propyl | 2,4-dimethylphenyl |
| I.153 | Br | 2,4-dimethylphenyl | n-propyl |
| I.154 | Br | ethyl | 2,4-dimethylphenyl |
| I.155 | Br | 2,4-dimethylphenyl | ethyl |
| I.156 | Br | H | 2,4-dimethylphenyl |
| I.157 | Br | 2,4-dimethylphenyl | H |
| I.158 | Br | methyl | 2,4-dimethylphenyl |
| I.159 | Br | 2,4-dimethylphenyl | methyl |
| I.160 | Br | 3-methoxypropyl | 2,4-dimethylphenyl |
| I.161 | Br | 2,4-dimethylphenyl | 3-methoxypropyl |
| I.162 | Br | 3-ethoxypropyl | 2,4-dimethylphenyl |
| I.163 | Br | 2,4-dimethylphenyl | 3-ethoxypropyl |
| I.164 | Br | 2-(2-methoxyethoxy)ethyl | 2,4-dimethylphenyl |
| I.165 | Br | 2,4-dimethylphenyl | 2-(2-methoxyethoxy)ethyl |
| I.166 | Br | sec-butyl | o-tolyl |
| I.167 | Br | o-tolyl | sec-butyl |
| I.168 | Br | t-butyl | o-tolyl |
| I.169 | Br | o-tolyl | t-butyl |
| I.170 | Br | n-butyl | o-tolyl |
| I.171 | Br | o-tolyl | n-butyl |
| I.172 | Br | i-propyl | o-tolyl |
| I.173 | Br | o-tolyl | i-propyl |
| I.174 | Br | n-propyl | o-tolyl |

-continued

| Ex. | R1 | $R_2$ | $R_3$ |
|---|---|---|---|
| I.175 | Br | o-tolyl | n-propyl |
| I.176 | Br | ethyl | o-tolyl |
| I.177 | Br | o-tolyl | ethyl |
| I.178 | Br | H | o-tolyl |
| I.179 | Br | o-tolyl | H |
| I.180 | Br | methyl | o-tolyl |
| I.181 | Br | o-tolyl | methyl |
| I.182 | Br | 3-methoxypropyl | o-tolyl |
| I.183 | Br | o-tolyl | 3-methoxypropyl |
| I.184 | Br | 3-ethoxypropyl | o-tolyl |
| I.185 | Br | o-tolyl | 3-ethoxypropyl |
| I.186 | Br | 2-(2-methoxyethoxy)ethyl | o-tolyl |
| I.187 | Br | o-tolyl | 2-(2-methoxyethoxy)ethyl |
| I.188 | H | phenyl | 2-phenylethyl |
| I.189 | H | 2-phenylethyl | phenyl |
| I.190 | Br | phenyl | 2-phenylethyl |
| I.191 | Br | 2-phenylethyl | phenyl |

II. APPLICATION EXAMPLES

The following dyes are used in the Application Examples:

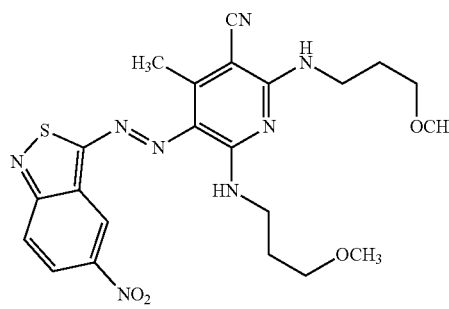
(101)

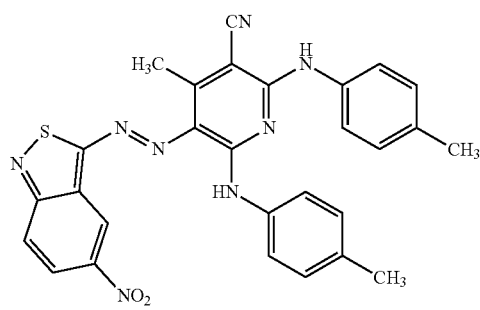
(102)

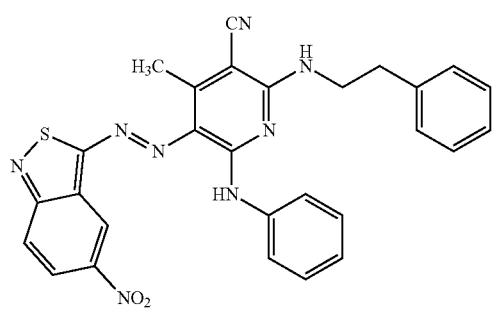
(103)

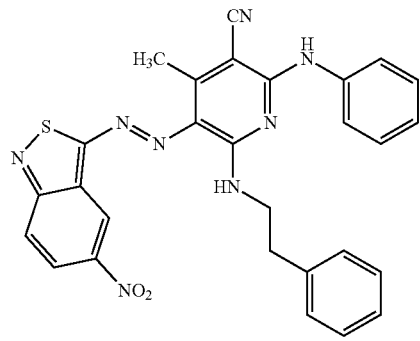
(104)

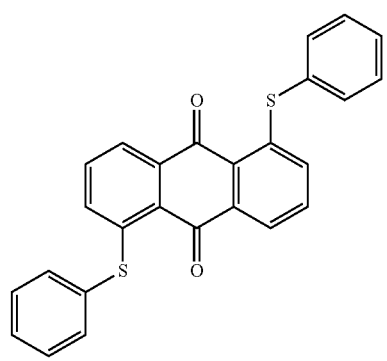
(201)

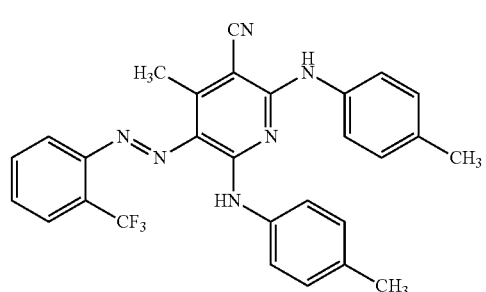
(301)

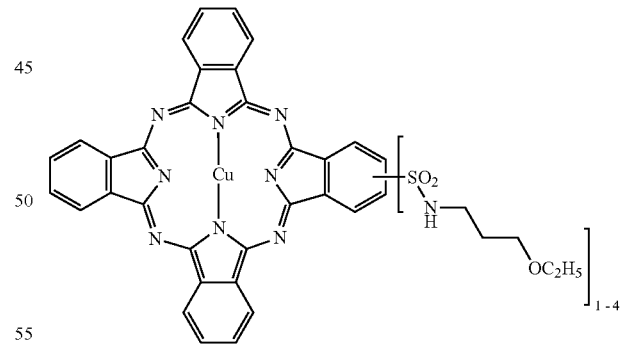
(401)

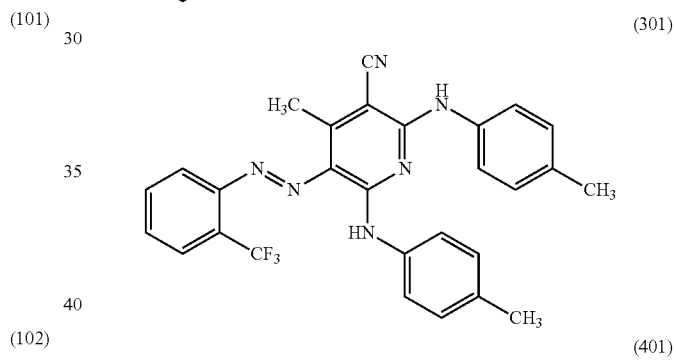

The procedure described in WO2005/024123 is carried out using the disperse dyes according to the invention and the thus obtained printed fabrics exhibit very good light fastness, wash fastness and rubbing fastness. The dispersion formulation is variable according to the dyes' properties and can be modified accordingly by the skilled artisan.

Example II. 1

A cotton/polyester fabric (Reference Nr. 7-3014, CO/PES 33/67, fixed, bleached, mercerized, 208 g/m², 30/30 tex) is padded at room temperature with an aqueous formulation containing 200 g/l of MACROGOL 400 EF (PEG, average molecular weight $M_w$=400, supplied by Brenntag), 40 g/l PREPAJET UNI (inkjet auxiliary, polyacrylic acid derivative, supplied by Huntsman) and 1 g/l ALBATEX AR (leveling agent, supplied by Huntsman) with a pick-up rate of 70-85%. After drying at 80-100° C. for 10 min, the thus prepared fabric is printed by ink-jet with an aqueous ink containing

- 3.3% by weight of a disperse dye of formula (101),
- 6.1% by weight of a disperse dye of formula (201),
- 1.6% by weight of a disperse dye of formula (401),
- 15% by weight of glycerol (85%)
- 16.7% by weight of a mixture of commercial water-soluble dispersants, and
- 57.3% by weight of deionized water.

After drying at 80-100° C. for 10 min, the printed fabric is fixed at 200° C. for 90 s. After cooling down, the printed fabric is rinsed with cold soft water and finally washed with a solution of 1 g/l commercial tenside, rinsed and dried.

Deep black prints of high color strength having good all-round fastness properties, especially wash fastness, rubbing fastness and light fastness, are obtained.

Similar results and properties are obtained if the dried print is fixed at lower temperature with longer fixation time or if it is fixed with superheated steam at 180° C. for 8 min.

Example II. 2

The same procedure as described in Example II. 1 is applied to a cotton fabric (Reference Nr. 1-3011, CO-crettone bleached, 135 g/m², 30/30 tex) instead of a cotton/polyester fabric.

Similarly to cotton/polyester, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 3

A polyester fabric (Reference Nr. 5-3208, fixed, 90 g/m²) is padded in a standard procedure for subsequent inkjet printing, with an aqueous formulation based on PREPAJET UNI (inkjet auxiliary, polyacrylic acid derivative, supplied by Huntsman). The thus prepared fabric is printed by ink-jet with the same inkjet ink as used in Example II. 1 and Example II. 2.

Deep black prints of high color strength having good all-round fastness properties, especially wash fastness, rubbing fastness and light fastness, are obtained.

Similar results and properties are obtained if the dried print is fixed at lower temperature with longer fixation time or if it is fixed with superheated steam at 180° C. for 8 min.

Example II. 4

The same procedure as described in Example II. 1 is applied using an aqueous ink containing

- 4.3% by weight of a disperse dye of formula (102),
- 2.7% by weight of a disperse dye of formula (201),
- 20.2% by weight of glycerol (85%)
- 6.3% by weight of a mixture of commercial water-soluble dispersants,
- 0.2% by weight of a commercial tenside, and
- 66.3% by weight of deionized water.

After drying at 80-100° C. for 10 min, the printed fabric is fixed at 200° C. for 90 s. After cooling down, the printed fabric is rinsed with cold soft water and finally washed with a solution of 1 g/l commercial tenside, rinsed and dried.

Deep black prints of high color strength having good all-round fastness properties, especially wash fastness, rubbing fastness and light fastness, are obtained.

Similar results and properties are obtained if the dried print is fixed at lower temperature with longer fixation time or is fixed with superheated steam at 180° C. for 8 min.

Example II. 5

The procedure described in Example II. 4 is applied to a cotton fabric (Reference Nr. 1-3011, CO-cretonne bleached, 135 g/m², 30/30 tex) instead of a cotton/polyester fabric.

Similarly to cotton/polyester, very deep black prints of high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 6

Standard screen printing paste (flat bed or rotary) is applied according to a method similar to that described in WO2005/024123. Fixing and washing conditions are similar to those mentioned in Examples II. 1-II. 5. Viscosity is adapted to the relevant flat bed and rotary screen printing method.

A stock paste P1 containing

- 84.9% by weight of deionized water,
- 10.0% by weight of Macrogol 400 EF,
- 5.0% by weight of a commercial thickener, and
- 0.1% by weight of a reduction inhibitor is prepared.

A cotton/polyester fabric (Reference Nr. 7-3014, CO/PES 33/67, fixed, bleached, mercerized, 208 g/m², 30/30 tex) is screen printed at room temperature with a printing paste containing

- 84.5% by weight of stock paste P1,
- 7.6% by weight of a dispersion containing 17.7% of disperse dye of formula (201),
- 6.7% by weight of a dispersion containing 15% of disperse dye of formula (101) and
- 1.2% by weight of a dispersion containing 19.2% of disperse dye of formula (401)

After drying at 80-100° C. for 10 min, the printed fabric is fixed at 200° C. for 90 s. After cooling down, the printed fabric is rinsed with cold soft water and finally washed with a solution of 1 g/l commercial tenside, rinsed and dried.

Deep black prints of high color strength having good all-round fastness properties, especially wash fastness, rubbing fastness and light fastness, are obtained.

Similar results and properties are obtained if the dried print is fixed at lower temperature with longer fixation time or is fixed with superheated steam at 180° C. for 8 min.

Example II. 7

The same procedure as described in Example II. 6 is applied to a cotton fabric (Reference Nr. 1-3011, CO-crettone bleached, 135 g/m², 30/30 tex) instead of a cotton/polyester fabric.

Similarly to cotton/polyester, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 8

The same procedure as described in Example 11.6 or Example 11.7 is applied to a PES fabric (Reference Nr. 5-3208, fixed, 90 g/m$^2$) instead of a cotton/polyester fabric, and using a standard stock paste for PES printing which does not contain any Macrogol 400 EF.

Similarly to cotton/polyester and cotton, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 9

The same procedure as described in Example II. 6 is applied using a printing paste containing
  85.2% by weight of stock paste P1,
  3.4% by weight of a dispersion containing 15% of disperse dye of formula (301),
  5.3% by weight of a dispersion containing 15% of disperse dye of formula (101),
  5.3% by weight of a dispersion containing 19.2% of disperse dye of formula (401) and
  0.8% by weight of deionized water After drying at 80-100° C. for 10 min, the printed fabric is fixed at 200° C. for 90 s. After cooling down, the printed fabric is rinsed with cold soft water and finally washed with a solution of 1 g/l commercial tenside, rinsed and dried.

Deep black prints of high color strength having good all-round fastness properties, especially wash fastness, rubbing fastness and light fastness, are obtained.

Similar results and properties are obtained if the dried print is fixed at lower temperature with longer fixation time or if it is fixed with superheated steam at 180° C. for 8 min.

Example II. 10

The same procedure as described in Example II. 9 is applied to a cotton fabric (Reference Nr. 1-3011, CO-crettone bleached, 135 g/m$^2$, 30/30 tex) instead of a cotton/polyester fabric.

Similarly to cotton/polyester, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 11

The same procedure as described in Example II. 9 or Example II. 10 is applied to a PES fabric (Reference Nr. 5-3208, fixed, 90 g/m$^2$) instead of a cotton/polyester fabric, and using a standard stock paste for PES printing which does not contain any Macrogol 400 EF.

Similarly to cotton/polyester and cotton, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 12

The same procedure as described in Example II. 6 is applied using a printing paste containing
  85.4% by weight of stock paste P1,
  1.3% by weight of a dispersion containing 17.7% of disperse dye of formula (201) and
  13.3% by weight of a dispersion containing 15% of disperse dye of formula (102)

After drying at 80-100° C. for 10 min, the printed fabric is fixed at 200° C. for 90 s. After cooling down, the printed fabric is rinsed with cold soft water and finally washed with a solution of 1 g/l commercial tenside, rinsed and dried.

Deep black prints of high color strength having good all-round fastness properties, especially wash fastness, rubbing fastness and light fastness, are obtained.

Similar results and properties are obtained if the dried print is fixed at lower temperature with longer fixation time or if it is fixed with superheated steam at 180° C. for 8 min.

Example II. 13

The same procedure as described in Example II. 12 is applied to a cotton fabric (Reference Nr. 1-3011, CO-crettone bleached, 135 g/m$^2$, 30/30 tex) instead of a cotton/polyester fabric.

Similarly to cotton/polyester, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 14

The same procedure as described in Example II. 12 or Example II. 13 is applied to a PES fabric (Reference Nr. 5-3208, fixed, 90 g/m$^2$) instead of a cotton/polyester fabric, and using a standard stock paste for PES printing which does not contain any Macrogol 400 EF.

Similarly to cotton/polyester and cotton, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 15

The same procedure as described in Example II. 6 is applied using a printing paste containing
  85.2% by weight of stock paste P1, 1.5% by weight of a dispersion containing 15% of disperse dye of formula (301) and 13.3% by weight of a dispersion containing 15% of disperse dye of formula (102)

After drying at 80-100° C. for 10 min, the printed fabric is fixed at 200° C. for 90 s. After cooling down, the printed fabric is rinsed with cold soft water and finally washed with a solution of 1 g/l commercial tenside, rinsed and dried.

Deep black prints of high color strength having good all-round fastness properties, especially wash fastness, rubbing fastness and light fastness, are obtained.

Similar results and properties are obtained if the dried print is fixed at lower temperature with longer fixation time or if it is fixed with superheated steam at 180° C. for 8 min.

Example II. 16

The same procedure as described in Example II. 15 is applied to a cotton fabric (Reference Nr. 1-3011, CO-crettone bleached, 135 g/m$^2$, 30/30 tex) instead of a cotton/polyester fabric.

Similarly to cotton/polyester, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 17

The same procedure as described in Example II. 15 or Example II. 16 is applied to a PES fabric (Reference Nr. 5-3208, fixed, 90 g/m$^2$) instead of a cotton/polyester fabric, and using a standard stock paste for PES printing which does not contain any Macrogol 400 EF.

Similarly to cotton/polyester and cotton, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 18

The same procedure as described in Example II. 6 is applied using a printing paste containing 80.7% by weight of stock paste P1, 1.3% by weight of a dispersion containing 22.6% of disperse dye of formula (201) and 18% by weight of a dispersion containing 15% of disperse dye of formula (102)

After drying at 80-100° C. for 10 min, the printed fabric is fixed at 200° C. for 90 s. After cooling down, the printed fabric is rinsed with cold soft water and finally washed with a solution of 1 g/l commercial tenside, rinsed and dried.

Deep black prints of high color strength having good all-round fastness properties, especially wash fastness, rubbing fastness and light fastness, are obtained.

Similar results and properties are obtained if the dried print is fixed at lower temperature with longer fixation time or if it is fixed with superheated steam at 180° C. for 8 min.

Example II. 19

The same procedure as described in Example II. 18 is applied to a cotton fabric (Reference Nr. 1-3011, CO-crettone bleached, 135 g/m$^2$, 30/30 tex) instead of a cotton/polyester fabric.

Similarly to cotton/polyester, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 20

The same procedure as described in Example II. 18 or Example II. 19 is applied to a PES fabric (Reference Nr. 5-3208, fixed, 90 g/m$^2$) instead of a cotton/polyester fabric, and using a standard stock paste for PES printing which does not contain any Macrogol 400 EF.

Similarly to cotton/polyester and cotton, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 21

The same procedure as described in Example II. 6 is applied using a different quality cotton/polyester fabric (Reference No 7-3011, CO/PES 35/65) and using a printing paste containing disperse dye of formula (201), disperse dye of formula (103) and disperse dye of formula (104).

After drying at 80-100° C. for 10 min, the printed fabric is fixed at 200° C. for 90 s. After cooling down, the printed fabric is rinsed with cold soft water and finally washed with a solution of 1 g/l commercial tenside, rinsed and dried.

Deep black prints of high color strength having good all-round fastness properties, especially wash fastness, rubbing fastness and light fastness, are obtained.

Similar results and properties are obtained if the dried print is fixed at lower temperature with longer fixation time or if it is fixed with superheated steam at 180° C. for 8 min.

Example II. 22

The same procedure as described in Example II. 21 is applied to a cotton fabric (Reference Nr. 1-3011, CO-crettone bleached, 135 g/m$^2$, 30/30 tex) instead of a cotton/polyester fabric.

Similarly to cotton/polyester, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 23

The same procedure as described in Example II. 21 or Example II. 22 is applied to a PES fabric (Reference Nr.

5-3208, fixed, 90 g/m²) instead of a cotton/polyester fabric, and using a standard stock paste for PES printing which does not contain any Macrogol 400 EF.

Similarly to cotton/polyester and cotton, very deep black prints of very high color strength having good all-round fastness properties, especially wash fastness, rubbing fastness and light fastness, are obtained on cotton/polyester fabric.

Similar results and properties are obtained if the dried print is fixed at lower temperature with longer fixation time or is fixed with superheated steam at 180° C. for 8 min.

Example II. 24

The same procedure as described in Example II. 1 is applied using a different quality cotton/polyester fabric (Reference No 7-3011, CO/PES 35/65) and using an aqueous ink containing 3.41% by weight of disperse dye of formula (201),
2.59% by weight of a mixture of disperse dye of formula (103) and disperse dye of formula (104),
25.50% by weight of glycerol (85%)
6.06% by weight of a mixture of commercial water-soluble dispersants,
2.96% by weight of a polyethylene glycol,
1% by weight of a commercial tenside,
0.23% by weight of a commercial bactericide agent, and
58.25% by weight of deionized water.

After drying at 80-100° C. for 10 min, the printed fabric is fixed at 200° C. for 90 s. After cooling down, the printed fabric is rinsed with cold soft water and finally washed with a solution of 1 g/l commercial tenside, rinsed and dried.

Deep black prints of high color strength having good all-round fastness properties, especially wash fastness, rubbing fastness and light fastness, are obtained.

Similar results and properties are obtained if the dried print is fixed at lower temperature with longer fixation time or is fixed with superheated steam at 180° C. for 8 min.

Example II. 25

The procedure described in Example II. 24 is applied to a cotton fabric (Reference Nr. 1-3011, CO-cretonne bleached, 135 g/m², 30/30 tex) instead of a cotton/polyester fabric.

Similarly to cotton/polyester, very deep black prints of high color strength having good all-round fastness properties, especially wash fastness, rubbing fastness and light fastness, are 690 obtained on cotton/polyester fabric.

Similar results and properties are obtained if the dried print is fixed at lower temperature with longer fixation time or is fixed with superheated steam at 180° C. for 8 min.

Example II. 26

The same procedure as described in Example II. 3 is applied using the aqueous ink described in Example II. 24.

Deep black prints of high color strength having good all-round fastness properties, especially wash fastness, rubbing fastness and light fastness, are obtained.

Similar results and properties are obtained if the dried print is fixed at lower temperature with longer fixation time or if it is fixed with superheated steam at 180° C. for 8 min.

TABLE 2

Color Coordinates and color depth measured according to the norm CIELAB 1976/DIN 6174, with D65/10 (Illuminant/Observer)

| Example # | L (Lightness) | a* | b* | C* (Chroma) | H (Hue) | RD (Reference Depth) |
|---|---|---|---|---|---|---|
| Example II.1 | 28.07 | −5.32 | −4.13 | 6.74 | 217.84 | 1.40 |
| Example II.2 | 21.72 | −0.71 | −5.47 | 5.51 | 262.57 | 2.13 |
| Example II.3 | 24.94 | −3.80 | −3.07 | 4.89 | 218.93 | 1.80 |
| Example II.4 | 25.01 | −3.25 | −0.10 | 3.25 | 181.76 | 1.81 |
| Example II.5 | 23.13 | 0.42 | −0.03 | 0.42 | 355.44 | 2.01 |
| Example II.6 | 23.27 | −2.73 | −1.59 | 3.16 | 210.29 | 2.07 |
| Example II.7 | 24.17 | 0.96 | −6.74 | 6.81 | 278.14 | 1.69 |
| Example II.8 | 23.80 | −2.66 | −3.50 | 4.40 | 232.83 | 1.96 |
| Example II.9 | 21.87 | −0.18 | −2.58 | 2.58 | 265.95 | 2.14 |
| Example II.10 | 22.45 | −0.79 | −5.35 | 5.41 | 261.63 | 1.98 |
| Example II.11 | 23.27 | 1.82 | −5.04 | 5.35 | 289.84 | 1.80 |
| Example II.12 | 21.76 | 0.96 | −2.35 | 2.54 | 292.20 | 2.17 |
| Example II.13 | 21.42 | 2.59 | −4.78 | 5.44 | 298.42 | 2.09 |
| Example II.14 | 23.52 | −4.11 | −7.27 | 8.35 | 240.51 | 1.87 |
| Example II.15 | 21.11 | 1.72 | 0.48 | 1.79 | 15.48 | 2.39 |
| Example II.16 | 21.76 | 2.02 | −1.06 | 2.28 | 332.24 | 2.17 |
| Example II.17 | 21.81 | −2.23 | −4.08 | 4.65 | 241.34 | 2.14 |
| Example II.18 | 20.96 | 2.72 | −2.91 | 3.98 | 313.07 | 2.23 |
| Example II.19 | 20.79 | 0.80 | −1.04 | 1.31 | 307.53 | 2.41 |
| Example II.20 | 20.68 | 2.71 | −2.28 | 3.54 | 319.90 | 2.31 |
| Example II.21 | 24.06 | −2.12 | −0.37 | 2.16 | 189.26 | 1.98 |
| Example II.22 | 25.15 | −1.90 | −0.18 | 1.91 | 158.35 | 1.79 |
| Example II.23 | 23.01 | −2.94 | −1.81 | 3.46 | 211.57 | 2.14 |

What is claimed is:

1. A colorant mixture comprising:
(A) at least one blue- or black-dyeing disperse dye of formula

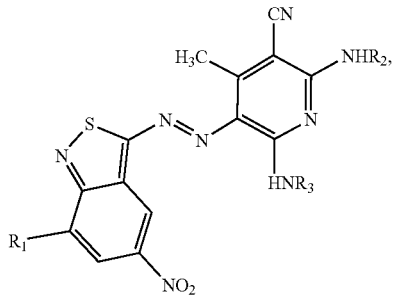

(1)

wherein
R₁ denotes hydrogen or halogen, and
R₂ and R₃ are each independently of the other phenyl, tolyl or 2-phenylethyl; and
(B) a dye of formula (2) or (3)

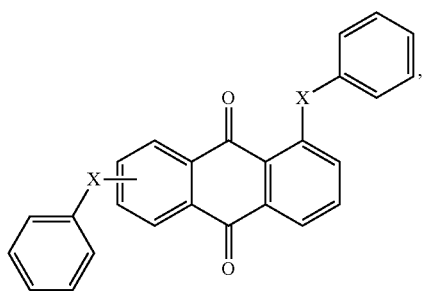

(2)

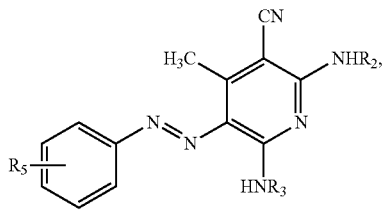

(3)

wherein X denotes —O—, —S— or —NHCO—,
R₂ and R₃ are as defined above, and
R₅ is CF₃ or —CN.

2. A colorant mixture according to claim 1 comprising as component (A) a dye of formula (1), wherein R₁ denotes hydrogen.

3. A colorant mixture according to claim 1 comprising as component (A) a dye of formula (1), wherein at least one of R₂ and R₃ is tolyl.

4. A colorant mixture according to claim 1 comprising as component (B) a dye of formula (201)

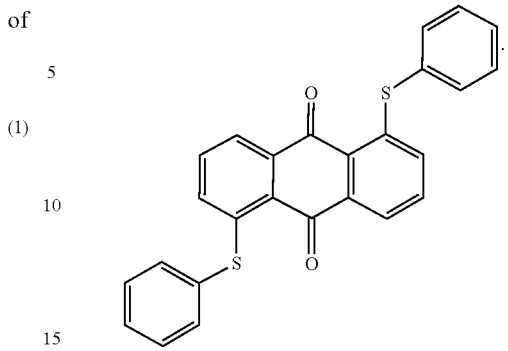

(201)

5. A colorant mixture according to claim 1 comprising as component (B) a dye of formula (301)

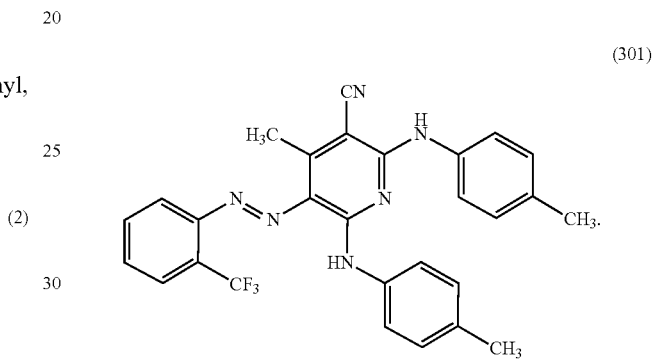

(301)

6. A colorant mixture according to claim 1 comprising, based on the total weight of components (A)+(B), 30-99% by weight of component (A) and 1-70% by weight of component (B).

7. A process for dyeing or printing cotton, polyester or cotton/polyester blend fibre material, wherein a colorant mixture according to claim 1 is applied to the said material or incorporated into it.

8. A process according to claim 7, wherein the colorant mixture is applied by screen-printing.

9. A process according to claim 7, wherein the dye is applied by inkjet-printing.

10. A process according to claim 7, characterised in that the fibre material is treated in any sequence with water, a water-soluble organic solvent having a boiling point greater than 150° C. and the colorant mixture.

11. A process according to claim 10, characterised in that the fibre material in a first step is treated with the water-soluble organic solvent having a boiling point greater than 150° C. and subsequently is printed with an aqueous ink comprising the colorant mixture.

12. A cotton, polyester or cotton/polyester blend fibre material, dyed or printed by the process according to claim 7.

* * * * *